(12) United States Patent
Patriarca (10) Patent No.: US 10,234,066 B2
(45) Date of Patent: Mar. 19, 2019

(54) ENCAPSULATION COLLAR FOR PIPELINES (71) Applicant: R2M Limited, Accrington (GB)

(72) Inventor: Sergio Patriarca, Pianezza (IT)

(73) Assignee: R2M Limited, Accrington (GB)

( * ) Notice: Subject to any disclaimer, the term of this patent is extended or adjusted under 35 U.S.C. 154(b) by 527 days.

(21) Appl. No.: 14/787,593

(22) PCT Filed: Apr. 30, 2014

(86) PCT No.: PCT/GB2014/000169
§ 371 (c)(1),
(2) Date: Oct. 28, 2015

(87) PCT Pub. No.: WO2014/177828
PCT Pub. Date: Nov. 6, 2014

(65) Prior Publication Data
US 2016/0109050 A1 Apr. 21, 2016

(30) Foreign Application Priority Data

Apr. 30, 2013 (GB) .................................. 1307774.8

(51) Int. Cl.
*F16L 55/178* (2006.01)
*F16L 21/02* (2006.01)
*F16L 55/17* (2006.01)

(52) U.S. Cl.
CPC ............. *F16L 55/178* (2013.01); *F16L 21/02* (2013.01); *F16L 55/17* (2013.01)

(58) Field of Classification Search
CPC .......... F16L 55/178; F16L 55/17; F16L 21/02
See application file for complete search history.

(56) References Cited

U.S. PATENT DOCUMENTS

| 3,487,856 A | 1/1970 | Turner et al. |
| 2007/0044858 A1 | 3/2007 | Cairns |
| 2014/0000743 A1 | 1/2014 | Biery et al. |

OTHER PUBLICATIONS

Search Report—PCT/GB2014-000169.

*Primary Examiner* — Ryan J. Walters
(74) *Attorney, Agent, or Firm* — Woodard, Emhardt, Henry, Reeves & Wagner, LLP (57) ABSTRACT

An apparatus and method for the containment of a portion of a pipeline is provided. The apparatus includes first and second parts, which when brought together form an interior cavity in which the said portion of the pipeline is located. The first and second parts have respective connection flanges that are held together under force to form a seal. First and second sealing members are also provided to be placed substantially around a circumference of the pipeline, the first and second sealing members being spaced apart along a longitudinal axis of the said pipeline portion.

15 Claims, 6 Drawing Sheets

ENCAPSULATION COLLAR FOR PIPELINES

The invention to which this application relates is to a form of apparatus known as an encapsulation collar which is an article which can be used in the repair of leaks, faults and/or damage to existing pipelines so as to allow the damage which has been caused to be contained within the collar and thereby allow the existing pipeline to remain in service. This therefore overcomes the need for removal of the existing pipeline in the area in which there is damage and, importantly, allows the repair of the pipeline to be achieved in situ and, in certain circumstances, to allow the supply of fluid through the pipeline to continue in an uninterrupted manner.

The provision of pipelines to carry fluid such as water, sewage, gas, oil and the like, is well known and there are many miles of pipeline already in position and/or which will be installed in the future. Over time, it is inevitable that leaks will occur in the pipeline which allow the escape of fluid therefrom and/or the condition of the pipeline deteriorates so as to prevent a risk of leakage and/or the pipelines are damaged due to external or internal impact.

In each case, conventionally, in order to overcome this problem, the length of pipeline in which the leak is formed and repair is required, has to be removed and replaced with a new pipeline portion or, alternatively, attempts can be made to enclose the portion of the pipeline in which the repair is to be made. There is also a significant demand and desire to be able to undertake the repair of the pipeline without disrupting the supply of fluid along the pipeline but, at the same time, there is a need to ensure the safety of personnel who are making the repair.

Safety concerns are particularly relevant with regard to flammable fluids which may pass along the pipeline, such as gas and oil, so that certain solutions may not be suitable for repairs on pipelines of this type. Furthermore, although it is known to provide collars which can be placed around the external face of the pipeline at the point of repair in order to attempt to contain any fluids which may leak through the point of repair, the known systems are required to be correctly positioned with regard to the portion which is to be repaired in order for the known apparatus to be effective, as only certain portions of the collar are formed so as to be able to provide a repair solution.

Furthermore, due to problems in effecting a clamping force on the repair collars, it is known that leakage can occur through the repair collars particularly at various interfaces, and that the clamping force which is applied, may only be effective in certain directions. As a result of this, the known collars are found to be only effective in certain instances. It is also known to provide apparatus in which end rings are provided which are clamped onto the pipeline externally of the collar and pipeline but this can take time to install and is susceptible to not operating correctly and/or not being capable of being correctly fitted to pipelines which have changes in dimensions and so the known apparatus has very little tolerance to dimension changes.

An aim of the present invention is to provide a repair apparatus which allows the containment of a damaged portion of a pipeline and allows containment of the portion in a manner which is effective whilst allowing variations in the condition of the pipeline, and in particular the pipeline wall, which is to be repaired, to be taken into account.

In a first aspect of the invention, there is provided apparatus for the containment of a portion of a pipeline, said apparatus including first and second parts which, when brought together, form an interior cavity in which the said portion of the pipeline is located, said first and second parts having respective connection flanges which are held together under force to form a seal and wherein first and second sealing members are provided to be placed substantially around the circumference of the pipeline and spaced apart along a longitudinal axis of the said pipeline portion and wherein each said sealing member is provided with respective ends which define a gap in the sealing member which is at least substantially closed once the apparatus is installed.

In one embodiment, the first and second sealing members, are respectively located, at, or adjacent to, the opposite ends of the apparatus.

Typically the gap can be extended to be of a sufficient size so as to allow the sealing member to be placed onto the pipeline by the pipeline passing through said gap and the sealing member is then positioned on and around the said pipeline.

Typically, the sealing member has sufficient resilience so as to allow the gap to be enlarged to a sufficient extent to allow the sealing member to be moved into position on the pipeline with the gap being of a sufficient size so as to allow the same to pass over the pipeline diameter and then the gap reduces once the sealing member is positioned around the pipeline. Typically, once the apparatus is formed the gap of the sealing member reduces to less than the size of the gap when the sealing member is in a relaxed condition prior to being placed onto the pipeline.

Typically, the said sealing member has an inner face which is provided to locate and seal with the external face of the pipeline, and an outer face which is provided to engage and seal with an inner face of a part of the apparatus when the parts of the brought together and interconnected.

Typically, the sealing member is formed of an elastomeric material.

In one embodiment, the said sealing member is located in a groove formed on the inner surface of the apparatus.

In one embodiment, the sealing member is provided with a first cross-sectional area and a second, reduced, cross-sectional area at at least one portion thereof.

In one embodiment, two reduced cross-sectional area portions are provided, at opposing sides of the sealing member.

Typically, the sealing member includes a portion which is provided to be located on one side, in one embodiment the underside, of the pipeline with respect to the longitudinal axis of the pipeline and a portion which extends to the other side, in one embodiment above, of the longitudinal axis of the pipeline when in position and said portion which extends to the said other side, in one embodiment above, the pipeline, includes the gap formed therein.

Typically, the said portions of reduced cross-sectional area are located at least in the portion which extends to the other side, in one embodiment above, of the pipeline. However, in one embodiment, the said portions of reduced cross-sectional area may also depend into the first portion of the sealing member.

In one embodiment, the reduced cross-sectional area is achieved by removing material from the external face of the sealing member.

In one embodiment, once the apparatus is formed, the length of the sealing member is extended to such an extent that the gap provided in the same is closed.

Typically, the size of the gap and the extent of material which is removed to form the reduced cross-sectional portions of the sealing member, are determined with regard to the size of the pipeline onto which the same is to be fitted and/or the condition and/or the material from which the pipeline has been made and/or the fluid which is to be carried along the pipeline.

In one embodiment there is provided an additional portion of sealing material which is provided as an insert located with the body part. Said insert is typically located at the location at which the gap in the sealing member which is to be located in the groove, is to be positioned such that if, when the apparatus is formed, the gap will not be entirely closed by the sealing member material movement, the insert is positioned to close the gap and complete the seal. Typically this insert can be provided in location on the groove at the time of provision of the apparatus for installation and, if required, the insert can be retained in position to be located in the gap of the sealing ring, or, if not believed to be required, as the gap will be closed by the sealing ring material movement, the insert can be removed from the groove prior to installing the apparatus in position.

In one embodiment the insert is identified by a, colour or other identification means and reference to the same is made in the installation instructions. Typically the decision as to whether or not to retain the insert in position at the time of installation is made with respect to the relative dimension of the pipeline and the size of the apparatus which is to be used. Most typically, when the diameter of the pipeline is relatively large the insert is retained and positioned in the gap of the sealing member during installation and when the size of the pipeline is relatively smaller the insert will be removed prior to installation.

Typically, an insert is provided and located in the apparatus body parts for each of the sealing members.

In one embodiment the insert may be used with sealing members which have a substantially uniform cross section or alternatively with sealing members which have one or more reduced cross section portions as herein described.

In a further aspect of the invention, there is provided a sealing member for an apparatus in use to repair a pipeline portion, said sealing member provided substantially in an annular form and, prior to forming of the apparatus, with a gap between respective ends of the sealing member, said gap can be increased in size so as to allow the sealing member to be placed around a pipeline to be repaired and sealable to form a sealing ring.

In one embodiment, the sealing member includes at least one, but typically two or more, portions of reduced cross-sectional area.

In one embodiment, the portions of reduced cross-sectional area are provided at opposing sides and located at or adjacent to, a horizontal axis of the sealing member when the same is in position respectively to the pipeline.

Typically, the weight of the pipeline on the sealing member and/or clamping force exerted to bring respective parts of the apparatus together to form the same, cause the gap in the sealing ring to be substantially closed by the time the apparatus is formed.

In a further aspect of the invention, there is provide a method of encapsulating a portion of a pipeline, said method comprising the steps of placing first and second sealing members around the pipeline, said sealing members spaced apart such that the first sealing member is placed towards a first end of the portion of the pipeline and the second sealing member is located towards the opposing end of the portion of the pipeline, bringing a first body part into location on one side of the pipeline portion and causing the sealing members to be located in respective location portions in the said part, moving a second body part of the apparatus into position on the opposing side of the pipeline and in line with said first part, applying engagement means to engage and clamp the first and second body parts together along the longitudinal axis of the said pipeline portion and causing the said first and second sealing members to exert a sealing action between the apparatus and their respective pipeline locations and hence form a cavity in the apparatus in which the portion of the pipeline is sealingly encapsulated.

In one embodiment, the said sealing member is changed in form between a form in which the same is placed around the pipeline and the form in which the same is held once the sealing cavity has been formed such that a gap between the said ends of the sealing member is at least substantially closed when the sealing cavity has been formed.

In one embodiment, the method comprises the use of sealing members which have a first cross-sectional area and at least first and second, spaced apart, portions which have a second, reduced, cross-sectional area.

In a further embodiment, the method comprises removing a portion of material from the external face of the sealing member so as to form each of the reduced cross-sectional area portion.

In one embodiment the method includes the step of providing at least one insert portion in position on the body part, at the location at which the gap in the sealing member is to be located during installation and, at the time of commencing installation deciding whether to retain the insert in position or remove the insert. If the insert is retained the same is located in the gap of the sealing member so as to form part of the sealing member and thereby at least substantially close the gap in the sealing member.

In a yet further embodiment of the invention there is provided apparatus for the containment of a portion of a pipeline, said apparatus including first and second parts which, when brought together, form an interior cavity in which the said portion of the pipeline is located, said first and second parts having respective connection flanges which are held together under force to form a seal and wherein first and second sealing members are provided to be placed substantially around the circumference of the pipeline and said first and second sealing members are spaced apart along a longitudinal axis of the said pipeline portion.

Specific embodiments of the invention are now described with reference to the accompanying drawings wherein.

Figure 1:
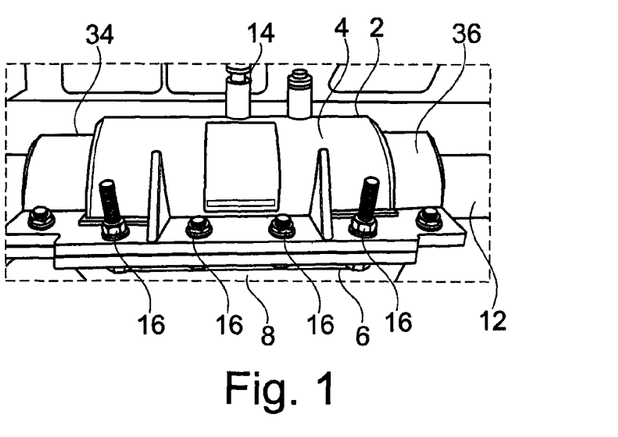
FIG. 1 illustrates apparatus in accordance with one embodiment of the invention in a formed condition.
Figure 2:
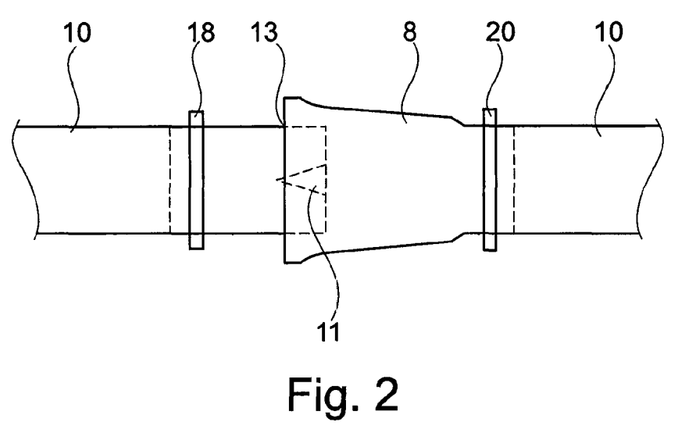
FIG. 2 illustrates a section of pipeline including the portion which is to be repaired.

Referring firstly to FIG. 1 there is illustrated apparatus 2 in accordance with one embodiment of the invention. The apparatus comprises first and second body parts 4, 6 which are located around a portion 8 of pipeline 10 shown in FIG. 2 which is to be repaired, in this example, due to a leak 11 at the pipeline join 13.

One of the body parts, 4, includes a release valve 14 which allows for the release of fluid while the apparatus is being formed around the portion 8 of the pipeline.

As can be seen, once the apparatus is formed the body parts 4, 6 are clamped together, along respective flanges formed along the longitudinal axis 12 on both sides of the pipeline, by a series of clamping means to thereby form the apparatus.

The apparatus will now be described in greater detail, with reference to the method used to form the same on portion 8 of pipeline 10 which is to be repaired.

Figure 3A:
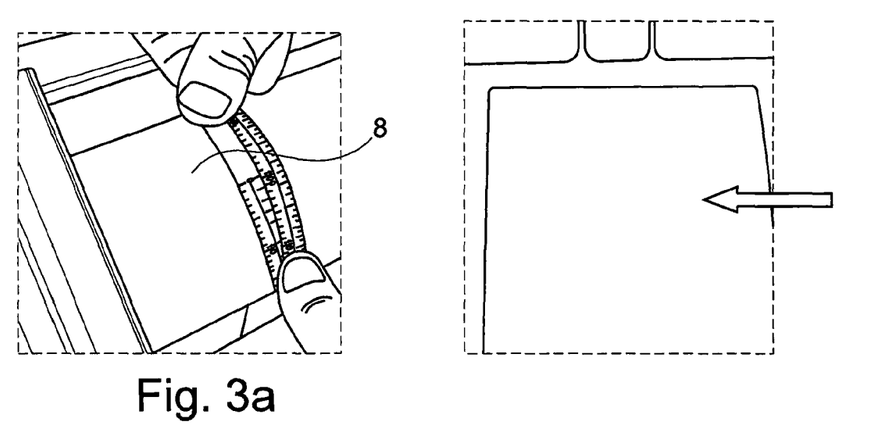
FIGS. 3a-n illustrate the stages undertaken in forming the apparatus around the repair portion.
Figure 3B:
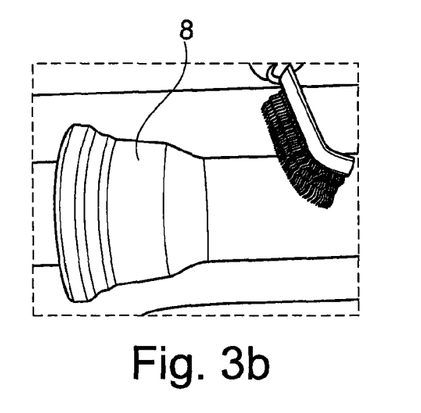
Figure 3C:
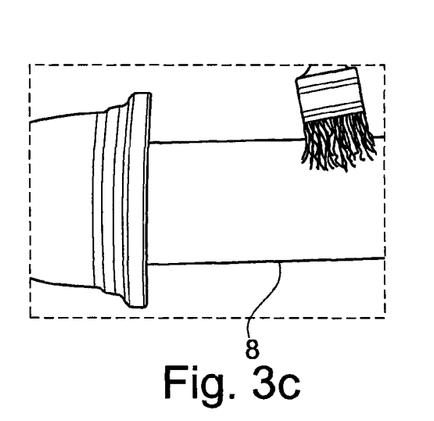
Figure 3D:
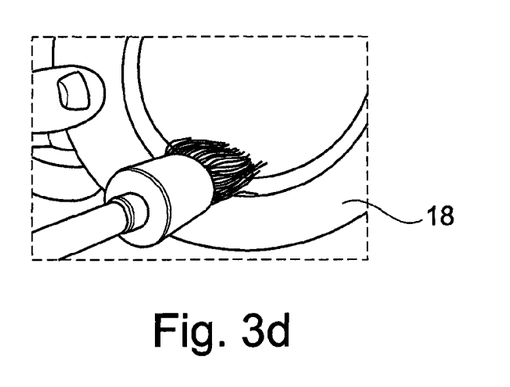
Figure 3E:
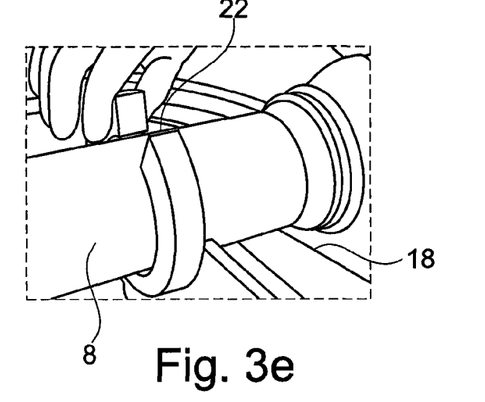

FIG. 3a illustrates the first step of the installation method which is to measure the diameter of the pipeline portion 8 and thereby select the appropriate size and form of apparatus to make the repair. The external surface of the pipeline is cleaned and lubricated as shown in FIGS. 3b and c. Then, first and second sealing members 18,20, one of which is shown in FIG. 3d, are lubricated, and then placed around the pipeline portion 8 at spaced locations towards opposing ends of the portion 8 as shown in FIGS. 3e, f, g and FIG. 2.

Figure 3F:
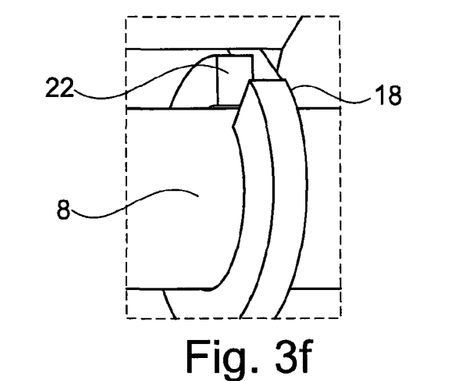
Figure 3G:
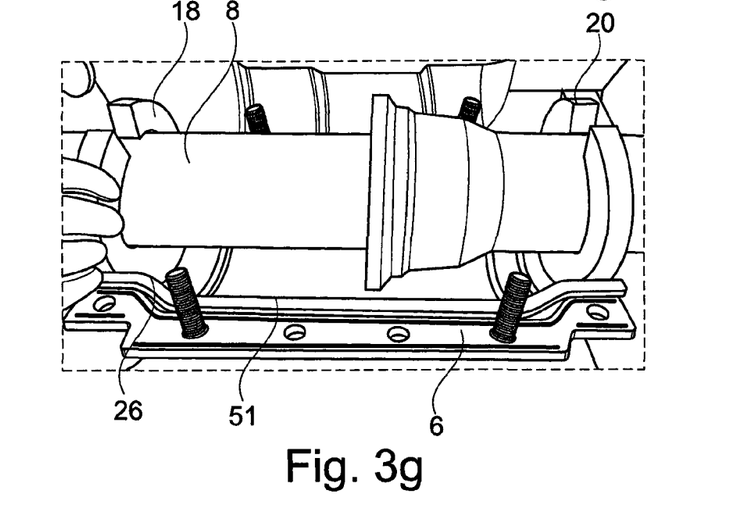
Figure 4A:
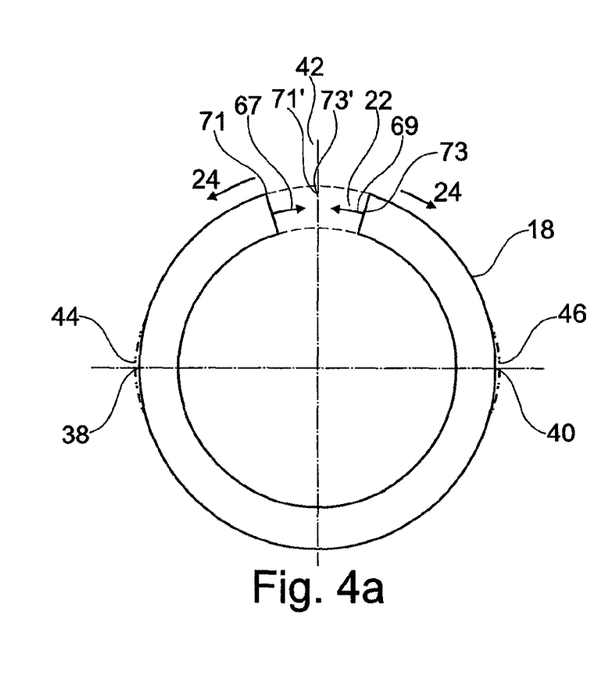
FIGS. 4a-d illustrate two embodiments of a sealing member in accordance with one embodiment of the invention.
Figure 4B:
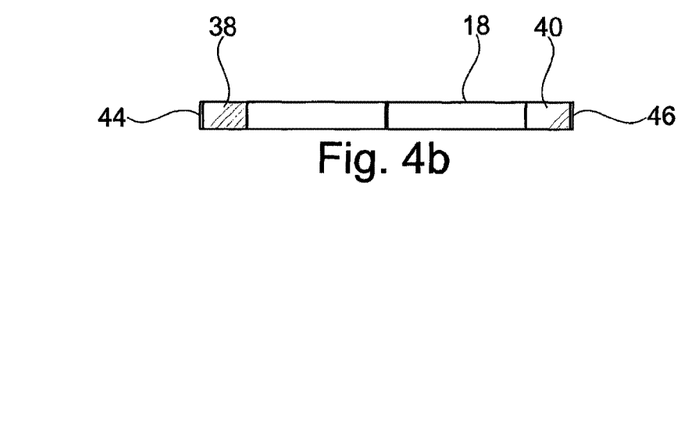

The sealing members 18,20, which can also be referred to as gaskets, are shown in one embodiment, in greater detail in FIGS. 4a and b and comprise a substantially annular member which is provided with a gap 22 therein. The size of the gap can be extended as indicated by arrows 24 so as to allow the same to be placed onto the pipeline such that the sealing member is then positioned around the pipeline, with the gap located at one side of the pipeline and typically that side which is most acted upon by the weight of the apparatus, typically the top side of the pipeline when the longitudinal axis of the pipeline is substantially horizontal, as shown in FIG. 3f.

Figure 3H:
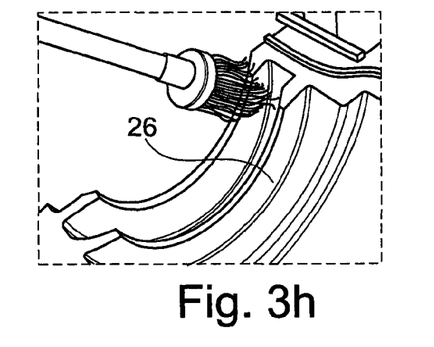
Figure 3I:
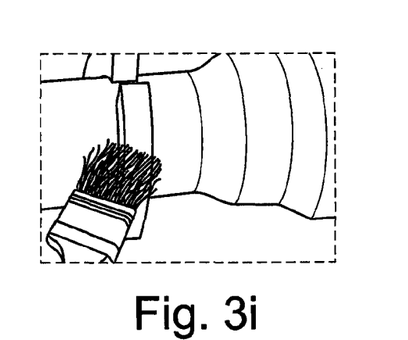

With the sealing members 18, 20 in position, further lubrication of the same and sealing member receiving locations or grooves 26 in the body parts 4, 6 can be performed as shown in FIGS. 3h and i. The first body part 6 of the apparatus is then located to the underside of the pipeline 8 as indicated by arrow 51 in FIG. 3g, with the sealing members 18, 20 being located in respective receiving locations 26 in the form of grooves on the inside face of the said part.

Figure 3J:
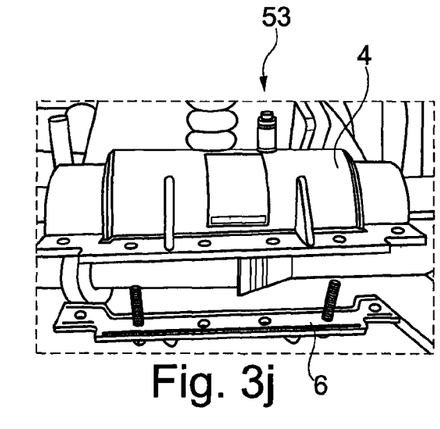
Figure 3K:
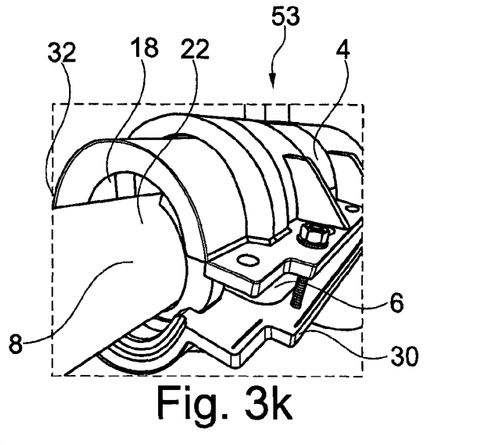
Figure 3L:
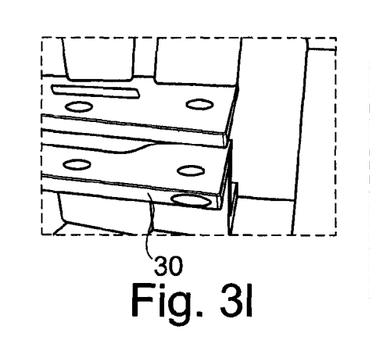

With the said body part 6 in position, the second body part 4 is introduced as indicated by arrow 53 as shown in FIGS. 3j and k to the opposing, typically the top, side of the pipeline and pushed down onto the pipeline 8 such that the sealing members 18, 20 are located in receiving location grooves 26 in the body part 6 and it will be seen that at this stage there is still the gap 22 in the sealing member 18.

Figure 3M:
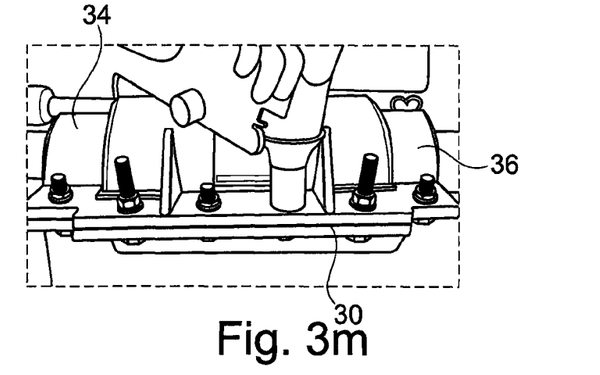
Figure 3N:
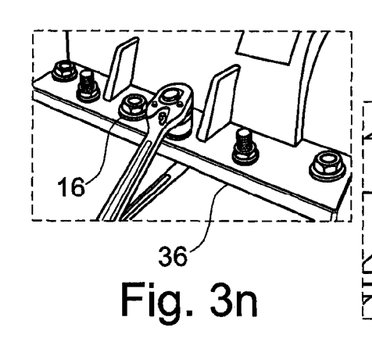

Once the body parts 4, 6 are in position, the clamping means 16 can be engaged as shown in FIGS. 3m and n to thereby ensure the seal along the longitudinal edge flanges 30,32 of the apparatus and also to ensure the seal at each of the ends 34, 36 of the apparatus is formed by substantially closing the gap 22 in each of the sealing members during the action of the closing process and thereby form an interior cavity in which the pipeline portion 8 is located and sealed so as to prevent any leakage from the apparatus.

In accordance with one embodiment of the invention, and in order to ensure that the seal is achieved by substantially closing the gap in the sealing members, the sealing members 18, 20 are formed with first and second portions 38,40 as shown in FIGS. 4a and b. These portions have a reduced cross-sectional area with respect to the cross-sectional area of the remainder of the sealing member. Preferably, the first and second portions are located at opposing sides of the sealing member with regards to the vertical axis 42 which is shown. The material which is removed in order to create the reduced cross-sectional area, is removed from the external face 44, 46 respectively of the sealing member as illustrated. The extent of material removal is decided with respect to the dimensions of pipeline for which the sealing member is provided to be used and/or the tolerances which are required to be provided for the sealing member when being fitted.

Figure 4C:
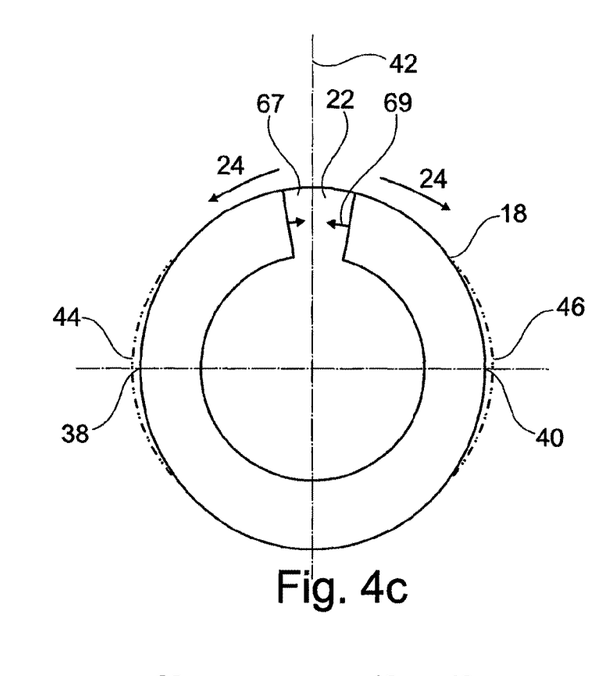
Figure 4D:
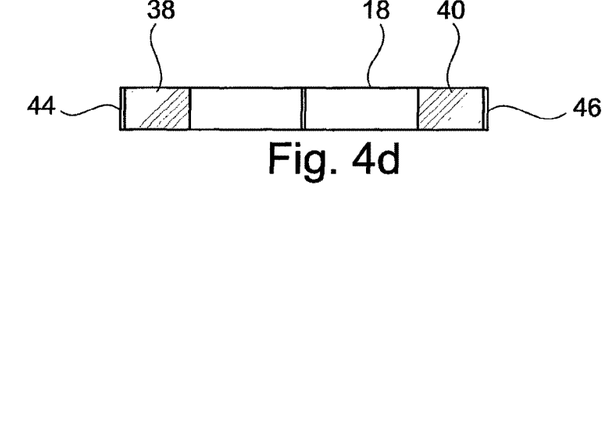

By providing the sealing member in this form, so the clamping action which is exerted on the body parts 4,6 of the apparatus to form the same, causes the material of the sealing member to extend upwardly into the location means groove 26 of the body part 4 of the apparatus and more importantly, this movement of the sealing member material causes, as shown by the movement arrows 67, 69 in FIGS. 4a and c, the gap 22 in the sealing member to be substantially closed as indicated by the broken lines with the ends 71, 73 of the sealing member in at least particle contact as shown in FIG. 4a where the contacting ends are illustrated by reference numerals 71' 73' in the broken lines which is sufficient to allow an effective seal to be created by the sealing member at each end. While the clamping force is required to be exerted on the body parts the relative dimension of the sealing member with respect to the groove in the body parts in which the sealing member is received is also a factor as the grooves or receiving locations 26 act as guide, and retaining means to ensure that the movement of the sealing member is in the required direction in order to move the sealing member ends together to close the gap. Thus the grooves or receiving locations 26 act to limit the movement of the sealing member material to movement in a substantially linear direction along substantially the circumference of the sealing member and to prevent or limit any lateral movement of the sealing member during the clamping action and thereafter in use in order to maintain the seal.

Figure 5A:
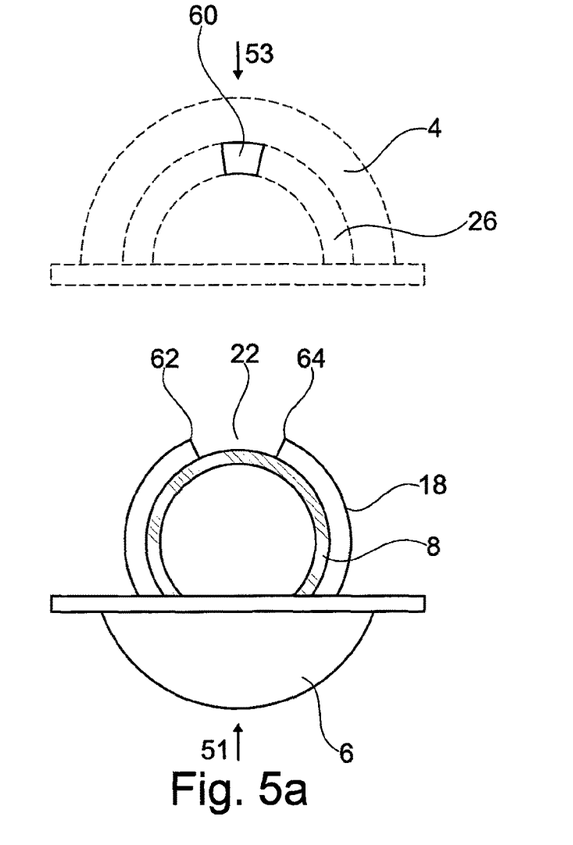
FIGS. 5a and b illustrate a further embodiment of the sealing member and apparatus in accordance with the invention.
Figure 5B:
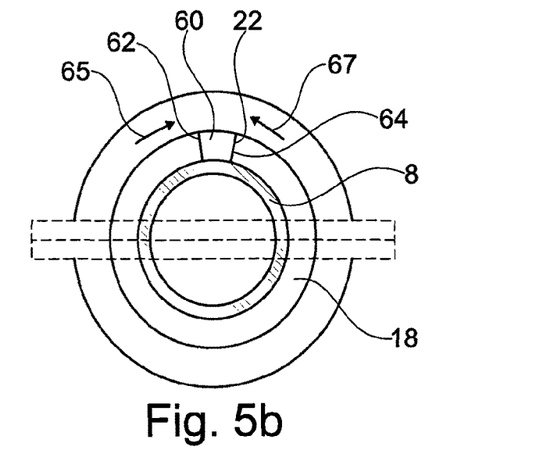

In addition to, or alternatively to providing the sealing member with one or more reduced cross section portions, the apparatus can include the provision of an insert which can be selectively used in conjunction with the sealing member as shown with reference to FIGS. 5a and b which illustrates in schematic manner end elevations of the apparatus and pipeline in accordance with one embodiment of the invention.

In FIG. 5a there is illustrated the body parts 4 and 6 prior to installation with respect to the pipeline 8 shown in cross section. One of the sealing members 18 is shown in position around the pipeline 8 with the gap 22 in the pipeline shown. In accordance with this embodiment of the invention the body part 4 is provided with an insert 60 which typically is of the same or similar elastomeric material used to form the sealing member 18. The insert is also positioned at the same location at which the gap 22 is located when the body parts are to be brought together.

The insert 60 is typically provided in position in the groove or receiving location 26 of the body part at the time of manufacture and can be releasably mechanically located. Typically at or prior to the time of installation a decision is made as to whether the pipeline dimensions and/or apparatus dimensions and or other factors such as environmental factors will allow the gap 22 of the sealing member to be closed by the clamping operation. If the decision is that this can be achieved by the clamping action then the insert 60 is removed and the clamping procedure progresses as described in FIGS. 3a-n.

If the decision is that the gap may not be closed by the clamping action alone of the two body parts, the insert 60 is retained in position and the body parts 4,6 moved into position as shown by arrows 51, 53 to the encapsulating position shown in FIG. 5b and in which all parts apart from the sealing member 18 and insert 60 are shown in broken lines for ease of illustration.

As will be seen in the FIG. 5b the insert 60 is positioned in the remaining gap 22 of the sealing member such that the seal is achieved and the gap is closed. Typically the clamping action of the body parts 4,6 causes the gap 22 to be made smaller by the movement of the sealing member material in the direction of arrows 65, 67 such that the ends 62, 64 of the sealing member 18 contact with the opposing side faces of the insert 60 and form the sealing ring. Thus, this embodiment is of particular use when the size of the pipeline and hence the sealing member is such as to not allow the movement of the sealing member itself under the clamping force to close the gap and the insert acts to ensure that the gap is closed.

There is therefore provided in accordance with the invention, apparatus which allows sealing members to be provided with a gap to allow the same to be fitted around the pipeline yet at the same time, once the apparatus is formed, to ensure that the gap is sufficiently closed so as to prevent leakage of fluid there through.

The invention claimed is:

1. Apparatus for the containment of a portion of a pipeline, said apparatus including first and second parts which, when brought together, form an interior cavity in which the said portion of the pipeline is located, said first and second parts having respective connection flanges which are held together under force to form a seal having first and second sealing members which are provided to be independently placed substantially around the circumference of the pipeline and located in respective receiving locations in the said first and second parts, said receiving locations spaced apart along a longitudinal axis of the said pipeline portion, each said sealing member provided with respective ends which define a gap in the sealing member which is at least substantially closed once the apparatus is installed, and wherein each said sealing member is provided with at least two portions in which a cross sectional area is reduced with respect to the cross sectional area of a remainder of the sealing member, said at least two portions are provided at opposing sides of the sealing member and said gap is located intermediate the said portions.

2. Apparatus according to claim 1, wherein the gap is located above the pipeline when in position.

3. Apparatus according to claim 1 wherein one of the portions of reduced cross-sectional area is located above the pipeline when in position.

4. Apparatus according to claim 1, wherein the first and second sealing members are respectively located at or adjacent opposite ends of the apparatus.

5. Apparatus according to claim 1, wherein the gap in the sealing member is extendable to a size so as to allow each sealing member to be placed onto and around said pipeline.

6. Apparatus according to claim 5, wherein the sealing members have sufficient resilience to allow enlargement of said gap to at least the size of the diameter of the pipeline portion and subsequently reduce in size once the sealing members are positioned around the pipeline portion.

7. Apparatus according to claim 1, wherein each sealing member has an inner face provided to locate and seal with an external face of the pipeline portion, and an outer face provided to engage and seal with an inner face of the first and second parts of the apparatus when brought together.

8. Apparatus according to claim 1 wherein each of the sealing members is movable in a substantially linear direction along substantially the circumference of the respective sealing member and prevent or limit lateral movement of the sealing member during the clamping action and thereafter in use of the apparatus in order to maintain the seal.

9. Apparatus according to claim 1 wherein said first and second parts are held together under force such that the gap provided in each of the sealing members is closed by the movement of the sealing member material.

10. Apparatus according to claim 1 further comprising an insert which is located in the gap of each sealing member.

11. Apparatus according to claim 10 wherein the gap is closed by the movement of the sealing member material to bring the respective ends of the sealing member into contact with opposing faces of the insert.

12. Apparatus according to claim 10 wherein the insert can be retained in position to be located in the gap of the sealing member, or can be removed prior to installing the apparatus.

13. Apparatus according to claim 7, wherein the external face of each sealing member generally conforms to a cylindrical shape except for the gap and the two portions in which the cross sectional area is reduced where the external face is recessed inside the cylindrical shape.

14. Apparatus according to claim 7, wherein the two portions in which the cross sectional area is reduced are created by removing material from the external face of each sealing member.

15. Apparatus according to claim 1, wherein each said sealing member is provided with at least two portions in which a cross sectional area as measured through a plane extending radially along the longitudinal axis of said pipeline portion is reduced with respect to the cross sectional area of the remainder of the sealing member.

* * * * *